United States Patent
Kim et al.

(10) Patent No.: US 7,124,054 B2
(45) Date of Patent: Oct. 17, 2006

(54) SYSTEM AND METHOD FOR MINING MODEL ACCURACY DISPLAY

(75) Inventors: Pyungchul Kim, Snoqualmie, WA (US); Zhaohui Tang, Bellevue, WA (US); David Earl Heckerman, Bellevue, WA (US); Scott Conrad Oveson, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 776 days.

(21) Appl. No.: 10/186,052

(22) Filed: Jun. 28, 2002

(65) Prior Publication Data

US 2004/0002929 A1 Jan. 1, 2004

(51) Int. Cl.
*G06E 1/00* (2006.01)

(52) U.S. Cl. .................................... 702/181
(58) Field of Classification Search ............ 702/181, 702/182, 179, 180
See application file for complete search history.

(56) References Cited

U.S. PATENT DOCUMENTS 6,535,817 B1 * 3/2003 Krishnamurti ............ 702/3
6,810,357 B1 * 10/2004 Tang et al. ............... 702/181

OTHER PUBLICATIONS

Agrawal, R. et al., "Mining Association Rules Between Sets of Items in Large Databases", *Proceedings of the 1993 ACM SIGMOD Conference*, May 1993, 1-10.

* cited by examiner

*Primary Examiner*—Bryan Bui
*Assistant Examiner*—Tung S. Lau
(74) *Attorney, Agent, or Firm*—Woodcock Washburn LLP

(57) ABSTRACT

Systems and methods are provided for producing displays of the accuracy of data mining or statistical models that produce associative predictions. For all cases in a testing data set, the model makes predictions and provides associated probabilities. The cases are sorted by their probability of making accurate predictions and a graph is made of the accuracy of the model over various subsets containing the highest probability cases as evaluated by the model. Where a number of probabilities are presented for the predictions in a basket of predictions, those probabilities are combined to yield a probability score for the entire basket. Additionally, the accuracy of a model over different basket sizes may be graphed. The accuracy graph may also be produced for any models making a prediction, by graphing the probability of making accurate predictions and a graph made of the accuracy of the model over various subsets of the data containing the highest probability cases.

83 Claims, 9 Drawing Sheets

SYSTEM AND METHOD FOR MINING MODEL ACCURACY DISPLAY

FIELD OF THE INVENTION

The present invention relates to systems and methods for evaluating and displaying the reliability of data mining or statistical models. The present invention also relates to systems and methods for displaying the accuracy of models that predict attribute association and for calculating a prediction score for multiple associative predictions. More particularly, the present invention relates to systems and methods for displaying a graph that describes the accuracy of predictive models, and systems and methods for displaying a graph that describes the accuracy of one or more attribute association models and to calculating a prediction score for combining the composite probability of several associative predictions, each with their own probability value.

BACKGROUND OF THE INVENTION

Data mining is the exploration and analysis of large quantities of data, in order to discover correlations, patterns, and trends in the data. Data mining may also be used to create models that can be used to predict future data or classify existing data.

For example, a business may amass a large collection of information about its customers. This information may include purchasing information and any other information available to the business about the customer. The predictions of a model associated with customer data may be used, for example, to control customer attrition, to perform credit-risk management, to detect fraud, or to make decisions on marketing.

To create and test a data mining model, available data may be divided into two parts. One part, the training data set, may be used to create models. The rest of the data, the testing data set, may be used to test the model, and thereby determine the accuracy of the model in making predictions.

Data within data sets is grouped into cases. For example, with customer data, each case corresponds to a different customer. Data in the case describes or is otherwise associated with that customer. One type of data that may be associated with a case (for example, with a given customer) is a categorical variable. A categorical variable categorizes the case into one of several pre-defined states. For example, one such variable may correspond to the educational level of the customer. There are various values for this variable. The possible values are known as states. The states of the educational level variable may be "high school degree," "bachelor's degree," or "graduate degree" and may correspond to the highest degree earned by the customer.

Data available is partitioned into two groups—a training data set and a testing data set. Often 70% of the data is used for training and 30% for testing. A model may be trained using only the training data set, which includes the state information. Once a model is trained, it may be run on the testing data set for evaluation. During this testing, the model will be given all of the testing data except the educational level data, and asked to predict a probability that the educational level variable for that customer is a particular state, such as "bachelor's degree".

Running the model on the testing data set, these results are compared to the actual testing data to see whether the model correctly predicted a high probability of the "bachelor's degree" state for cases that actually have "bachelor's degree" as the state of the educational level variable.

One method of displaying the success of a model graphically is by means of a lift chart, also known as a cumulative gains chart. To create a lift chart, the cases from the testing data set are sorted according to the probability assigned by the model that the variable (e.g. educational level) has the state (e.g. bachelor's degree) that was tested, from highest probability to lowest probability. Once this is done, a lift chart can be created from data points (X, Y) showing for each point what number Y of the total number of true positives (those cases where the variable does have the state being tested for) are included in the X% of the testing data set cases with the highest probability for that state, as assigned by the model.

As shown in FIG. 1, the conventional lift chart shows that there are 1000 total true positives in the testing set. This is not necessarily the number of cases in the testing data set. Some cases may have a different state for the variable than the one being tested. The number of true positives in the testing data set is the highest number shown on Y axis 10. The X axis 20 correlates with the percentage of cases with the highest probabilities. Lift line 30 depicts the success of the model. For example, it can be seen that lift line 30 includes a point with (X, Y) coordinates are approximately (20, 500). This indicates that, in the 20% of the cases selected by the model as the most probable cases having the tested-for state of the variable, approximately 500 of the cases that are truly positive for the state of the variable are included. This is equivalent to getting 50% of the actual cases with the desired state in only 20% of the cases tested for.

A model that randomly assigns probabilities would be likely to have a chart close to the random lift line 40. In the top 10% of cases, such a model would find 10% of the true positives. Note that the X axis may also be expressed in the number of high probability cases, and the Y axis in percentages. A perfect model may also be considered. In a situation where there are N % true positives among the entire testing data set the lift line would stretch straight from the origin to the point (N, $Y_{MAX}$) (where $Y_{MAX}$ is the maximum Y value). This is because all of the true positives would be identified before any false positives are identified. The lift line for the perfect model would then continue horizontally from that point to the right. For example, if 20% of the cases had the tested for state, as shown in FIG. 2, a perfect model would have the perfect lift line 50, extending from (0,0) to (20, 1000) and then from (20, 1000) to (100, 1000). Similarly, the worst case model would identify no true positives until the last N % of the testing population is included, and, as shown in FIG. 3 for the case where there are 20% true positives, the worst case lift line 60 for such a model would extend from (0,0) to (80, 0) and then straight from (80,0) to (100, 1000).

As described above, in the prior art, a lift chart can be used to display and measure the prediction accuracy of a model for a given state of a categorical variable. However, existing lift charts do not have any capability for measuring the effectiveness of a model in predicting an association. Additionally, the prior art lift chart can be used to display the prediction accuracy of a model in terms of the percentage of true positives captured in different size groups of cases with the highest associated probabilities, however, there is no capability for understanding what the size of the number of true positives in the testing data set.

Thus, there is a need for a method and system for generating for display improved charts with which to display the accuracy of models.

SUMMARY OF THE INVENTION

In view of the foregoing, the present invention provides systems and methods for creating a chart displaying the accuracy of a model in making predictions. The present invention also provides systems and methods for creating a chart displaying the accuracy of a model in predicting associations. Graphical displays of the accuracy of the model in single-association and multiple-association predictions are provided, as well as a technique for graphically displaying the predictive value of a model across varying numbers of suggested items.

According to one embodiment of the inventive technique, one piece of association data is removed from each case in the testing data set. The model is used to make a prediction of an association that matches the remaining data in each case. The model also provides a probability for the prediction. This prediction and probability, along with knowledge of whether the predicted association was, indeed, the association removed from the case, can be used to create a chart. The cases are sorted by probability, and the number of correct predictions Y in the most probable X percent of the cases is graphed.

However, if there are a large number of possible associations, most models given the chance to make one association will not perform very well. For example, where there are thousands of products that may have been purchased by the consumer, a model may not be successful in determining the correct product given only one chance. Therefore, results from a chart tracking a model's success in making one association given one chance may, in some cases, not provide significant useful information. In such cases, allowing a model to select a basket containing multiple predictions in order to identify the missing association may provide more useful information about the model. The present invention, therefore, also presents a technique for displaying the accuracy of a model providing multiple predictions in graphical form. Again, one association is removed from each case in the testing data set. A basket of multiple predictions are made by the model, and the model assigns a cumulative probability to the basket of predictions. Where individual probabilities from each prediction in the basket are assigned, a probability score is created from these probabilities. The cases are sorted by the probability score or cumulative probability, and the number of correct predictions Y in the most probable X percent of the cases is graphed.

Additionally, a technique for displaying the accuracy of a model that predicts associations in a novel association prediction accuracy chart is provided. A comprehensive association accuracy line is created from points such that, for each point (X,Y), X corresponds to the size of a prediction basket. For example, if the associations are products that a customer has purchased or might purchase and there are N products, the X axis would range between zero and N. Other ranges may also be used. The Y value for each data point corresponds to the model's effectiveness when making X predictions. The Y value is calculated by allowing the model to make a basket of X predictions for each case, and calculating the percentage of total cases in which the model picked the missing association in the basket. When various (X,Y) pairs are calculated and graphed, a multiple-association accuracy line that displays the effectiveness of the model is produced.

Additionally, a technique for displaying the accuracy of a model that makes predictions regarding data cases is provided. A comprehensive association accuracy line is created from points such that, for each point (X,Y), the number of correct predictions Y in the most probable X percent of the cases is graphed.

Other features and embodiments of the present invention are described below.

BRIEF DESCRIPTION OF THE DRAWINGS

The system and methods for model accuracy display for multiple state prediction in accordance with the present invention are further described with reference to the accompanying drawings in which.

DETAILED DESCRIPTION OF THE INVENTION

Overview

As described in the background, the conventional lift chart can only display the effectiveness of a model at predicting one state of a multi-state variable. A method and system are presented for providing a display of the accuracy of a data-mining model that predicts associations given information in the testing data set, rather than predicting states of a categorical variable. The method and system will be described with reference to a data mining model, however, any statistical model that can be used to make associative predictions may be used with the method and system of the invention.

One associated piece of data is removed from each case in the testing data set. The model is requested to make one prediction, or, in an alternative embodiment, a basket of several predictions, as to what data is associated with the remaining data in the case. The model also provides a probability for each prediction. In the case where the model provides multiple predictions with separate probabilities, a combined probability score may be calculated from individual probabilities. The cases are sorted by the associated probability or by the combined probability score.

The cases are then examined to determine whether the prediction or predictions contain the correct association. The percentage of correct predictions among the highest-probability cases is graphed.

Additionally, a comprehensive association prediction accuracy chart may be prepared. This chart graphs points (X,Y) corresponding to the effectiveness of the model Y across all cases when the model has made a number X of associative predictions.

Additionally, an accuracy chart may be created for any model making predictions on a number of cases in a data set. Once the model has made predictions and assigned associated probabilities to the predictions, the cases are then examined to determine whether the predictions are correct. The amount of correct predictions among the highest-probability cases is graphed.

Exemplary Computing Environment

Figure 1:
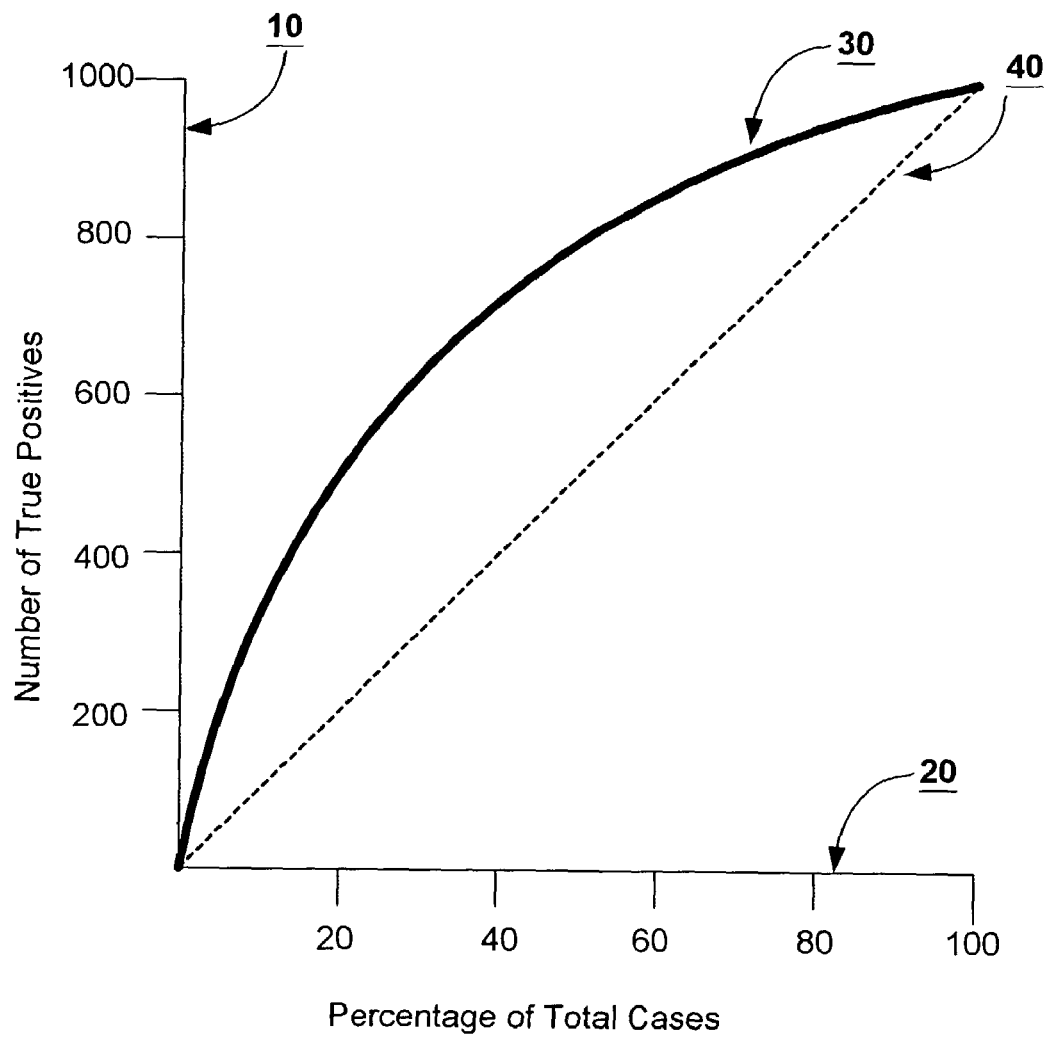
FIG. 1 is a lift chart according to the prior art with an exemplary model lift line and a random lift line depicted.
Figure 2:
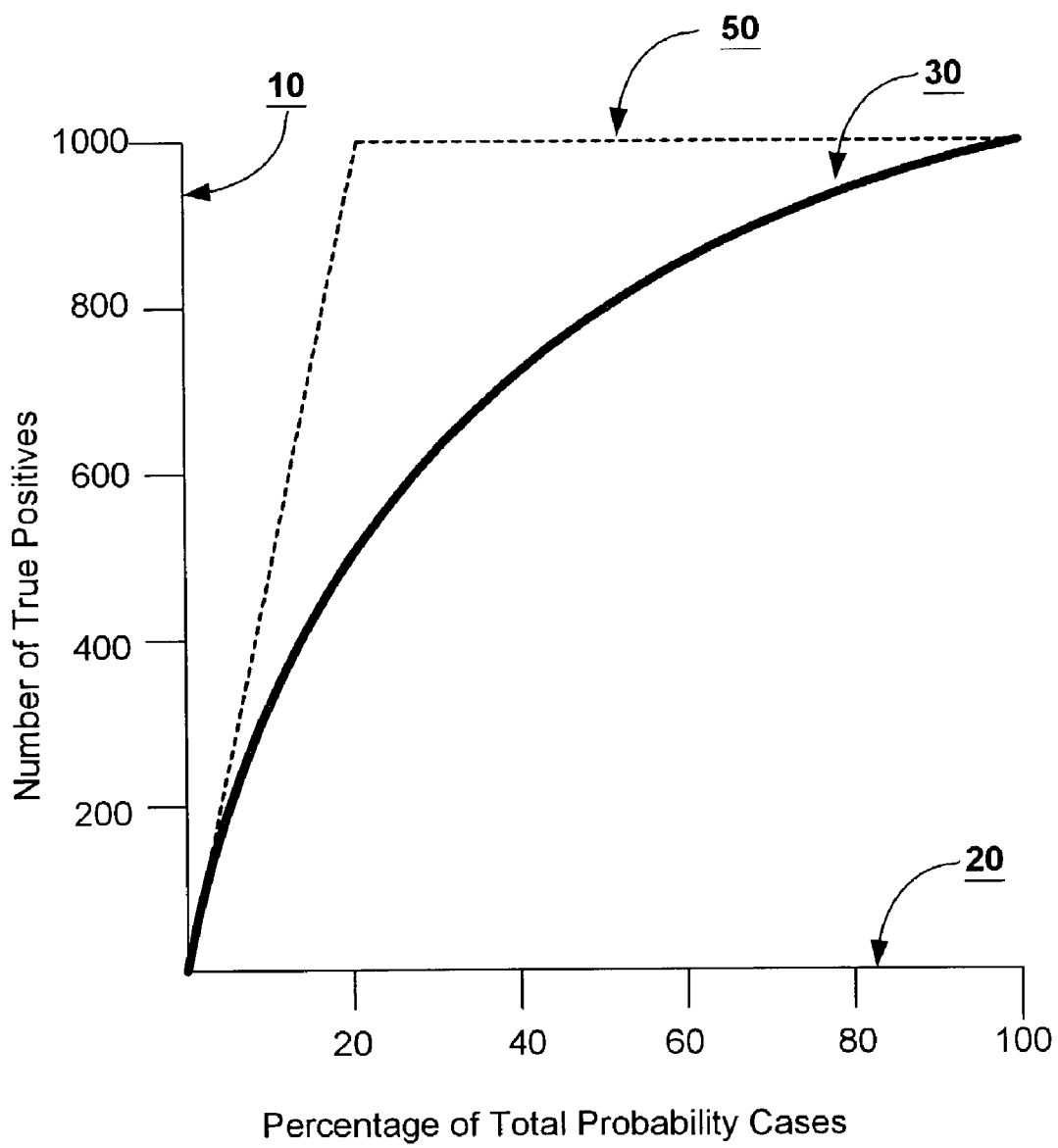
FIG. 2 is a lift chart according to the prior art with an exemplary model lift line and an ideal lift line depicted.
Figure 3:
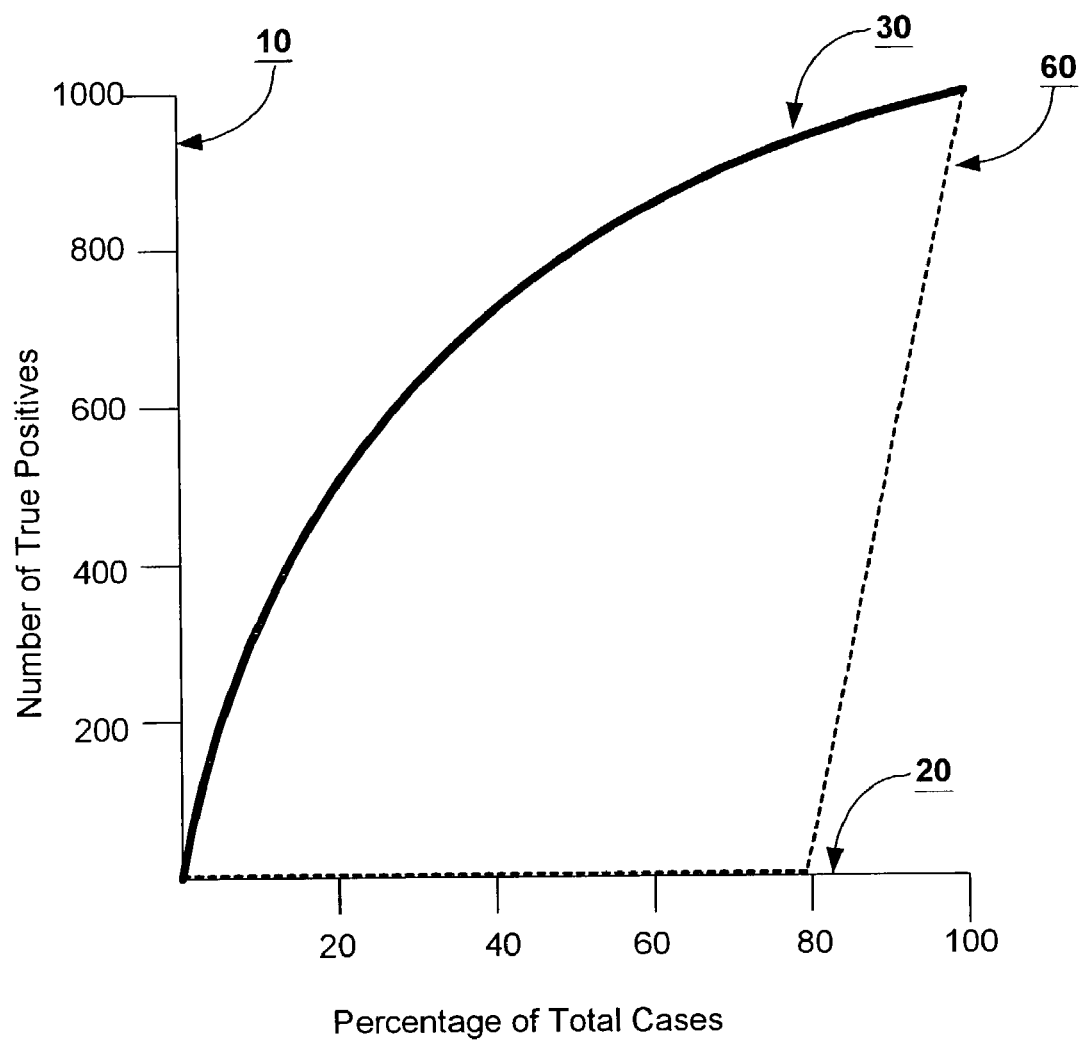
FIG. 3 is a lift chart according to the prior art with an exemplary model lift line and a worst case lift line depicted.
Figure 4:
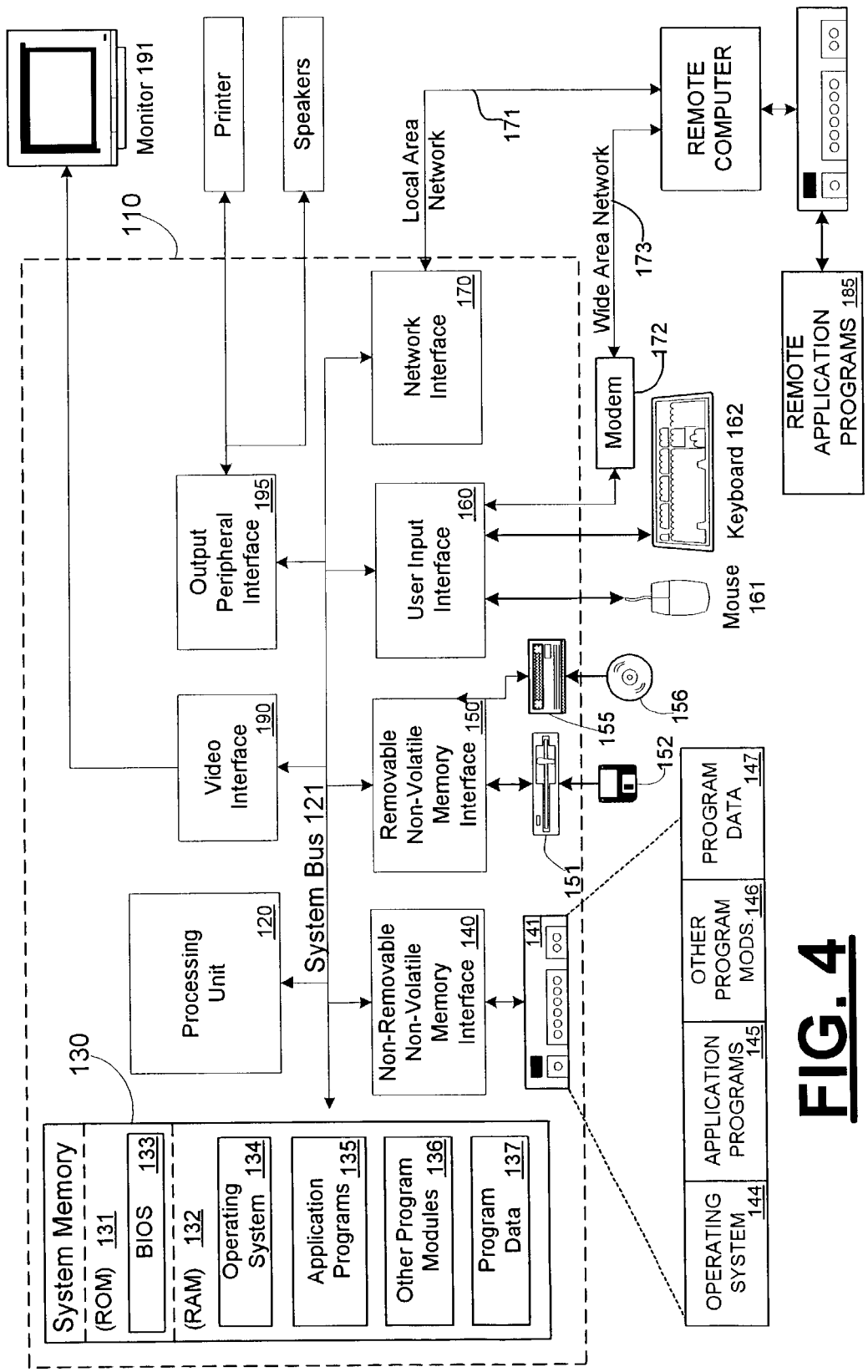
FIG. 4 is a block diagram of an exemplary computing environment in which aspects of the invention may be implemented.

FIG. 4 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices. Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may utilize the techniques of the present invention.

With reference to FIG. 4, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium that can be used to store the desired information and that can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136, and program data 137.

The computer 110 may also include other removable/non-removable, volatile/nonvolatile computer storage media. By way of example only, FIG. 4 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4, provide storage of computer readable instructions, data structures, program modules and other data for the computer 110. In FIG. 4, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 4. The logical connections depicted in FIG. 4 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on memory device 181. It will be appreciated that the network connections shown are exemplary and other means of establishing a communications link between the computers may be used.

Calculation and Display of Associative Prediction Evaluation

In order to calculate and display an evaluation of the success of a model in predicting an association, the inventive technique evaluates whether the model can correctly identify an item that has been removed from a test case.

In order to evaluate the accuracy of an associative model, the testing data set used must contain cases that include associated data. For example, the model can be used on a testing data set where each case describes one customer, and where each case contains data about purchases by that customer.

The technique displays an evaluation of the success of the model by first removing one item of associated data from each case in the testing data set. Then the model can either be tested on a single-association prediction or multiple-association (basket) prediction, with the results displayed in graphical form.

The model's accuracy may also be evaluated by generating for display a comprehensive association prediction accuracy chart which displays the accuracy of the model across a range of numbers of predictions made.

Single-Association Testing and Display

Single-association testing is the testing of the model to see if it can, with only one prediction, correctly predict which item of associated data has been removed from each case in the testing data set.

Once a case has had an item removed, the model is queried for a prediction regarding an item associated with the remaining items in the case. The model also provides the probability that it assigns to the correctness of its prediction.

Figure 5:
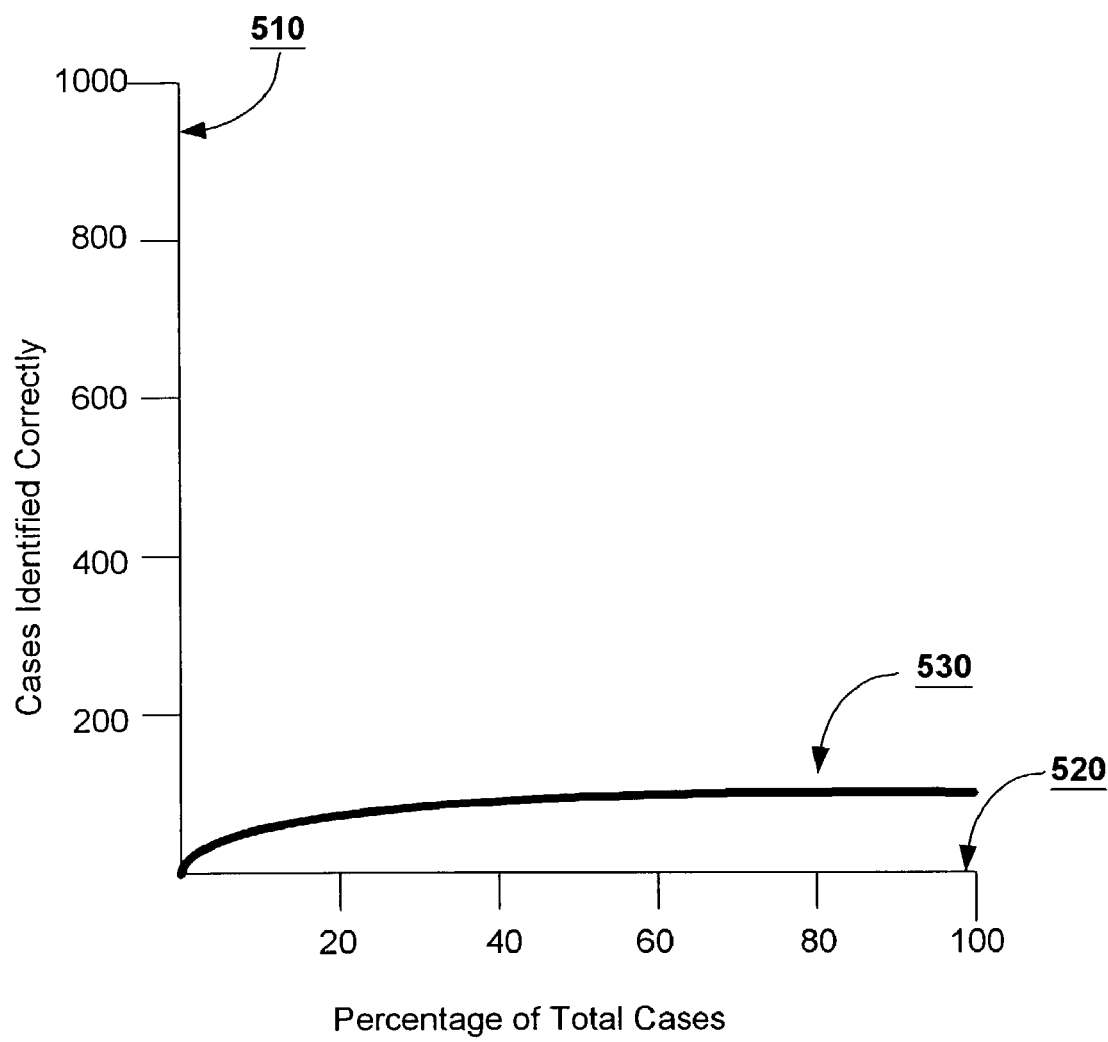
FIG. 5 is a chart according to the present invention with a single-association prediction evaluation line depicted.

The cases may then be ordered with respect to the probabilities assigned to the prediction for each case. The predictions are checked to determine whether they were correct. This data may then be displayed on a chart. As shown in FIG. 5, a single-association prediction line 530 is generated from points (X,Y), where for a group of cases with the highest probabilities assigned by the model, X corresponds to the number of cases in that group and Y corresponds to the number of correct predictions in that group. In the exemplary graph in FIG. 5, the X axis 520 is measured in percentages, and the Y axis 510 in total number of cases. The maximum value on the Y axis 510 is 1000. This may be the total number of cases in the testing data set or some smaller number of cases. A Y axis with a maximum less than 100% or the number of total cases may be used for a clearer display when the total number of correct identifications is small.

Multiple-Association Testing and Lift Chart Display

A model may also have the capability to provide more than one prediction for the missing associated data item. This multiple prediction is also called a basket prediction. In this case, if the model also provides a composite probability for its set of predictions, the composite probability can be used according to the method described for a single association prediction.

If, however, the model only provides a probability for each of its predictions for the missing associated data item, a combined probability score must be assigned. Where the model gives a probability score for each possible item, in one embodiment the formula for a combined probability score is given by:

$$\frac{\sum_{i=1}^{k} p(A_i)}{\sum_{j=k+1}^{N} p(A_j)} \quad (1)$$

In this formula (1):
k represents the number of predictions made by the model;
N represents the total number of association items which may be predicted by a model;
$A_i$ represents association item i, where items 1 through k are the predictions made by the model, and k+1 through N are the association items not included in the predictions made by the model; and
$p(A_i)$ represents the probability that the model assigns to $A_i$ being the held out item.

Other formulas for a probability score, including prior art formulas for combining probabilities, are possible.

Once a probability score is assigned to the basket of predictions made by the model, the cases may be ordered with respect to these probability scores. If the model assigns a single probability to a basket of predictions, this probability is used to order the cases. The predictions are checked to determine whether the removed item was identified in the basket of predictions. If so, the basket of predictions is deemed to be correct. This data may be graphed.

Figure 6:
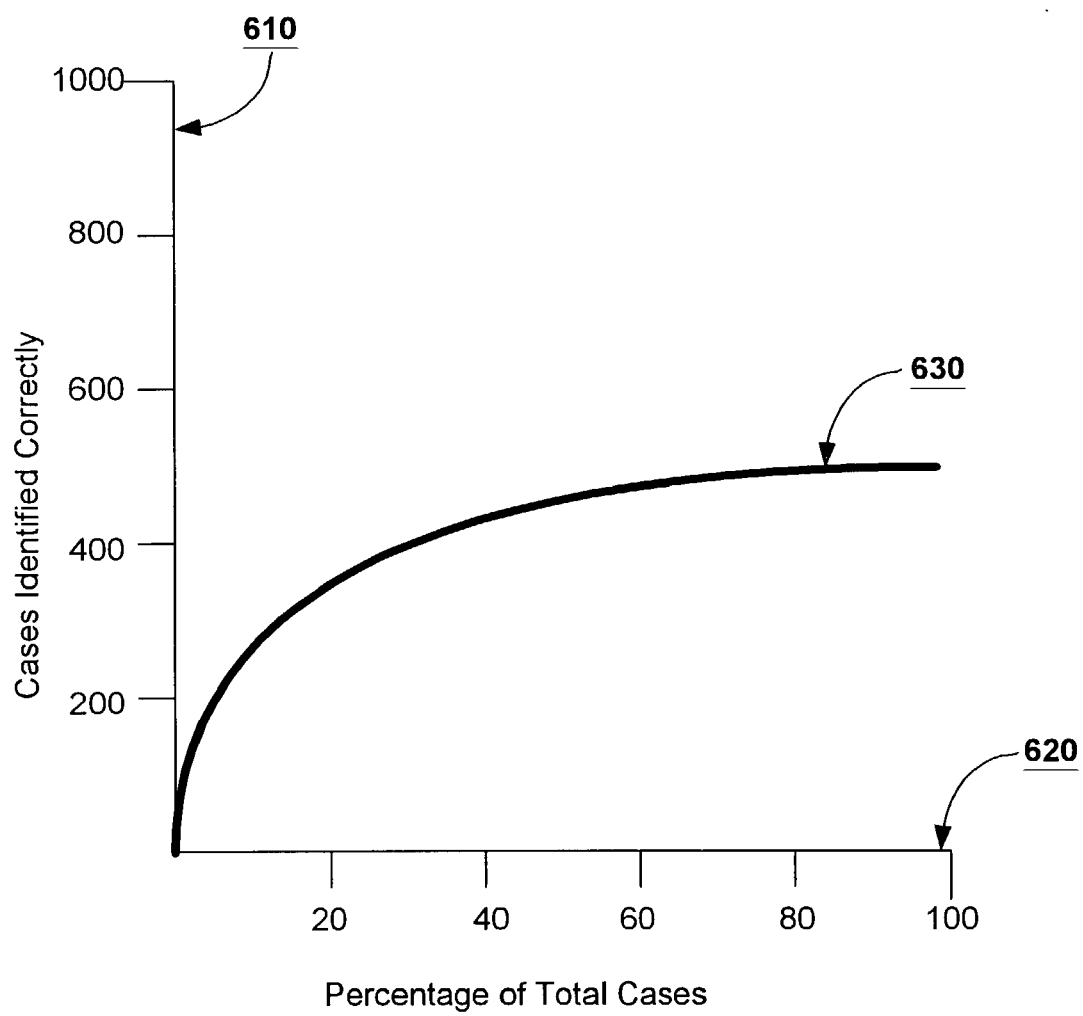
FIG. 6 is a chart according to the present invention with a multiple-association prediction evaluation line depicted.

As shown in FIG. 6, a multiple-association prediction line 630 is generated from points (X,Y), where for a group of cases with the highest probability score (or probability assigned by the model), X is the amount of cases in that group and Y is the amount of correct predictions in that group. In the exemplary graph in FIG. 6, the X axis 620 is measured in percentages, and the Y axis 610 in total number. As before, the maximum value on the Y axis is 1000, which may represent the total number of cases in the testing data set or some smaller number of cases. Again, a Y axis with a maximum less than 100% or the number of total cases may be used for a clearer display when the total number of correct identifications is small.

Calculation and Display of Associative Prediction Accuracy Graph

Figure 7:
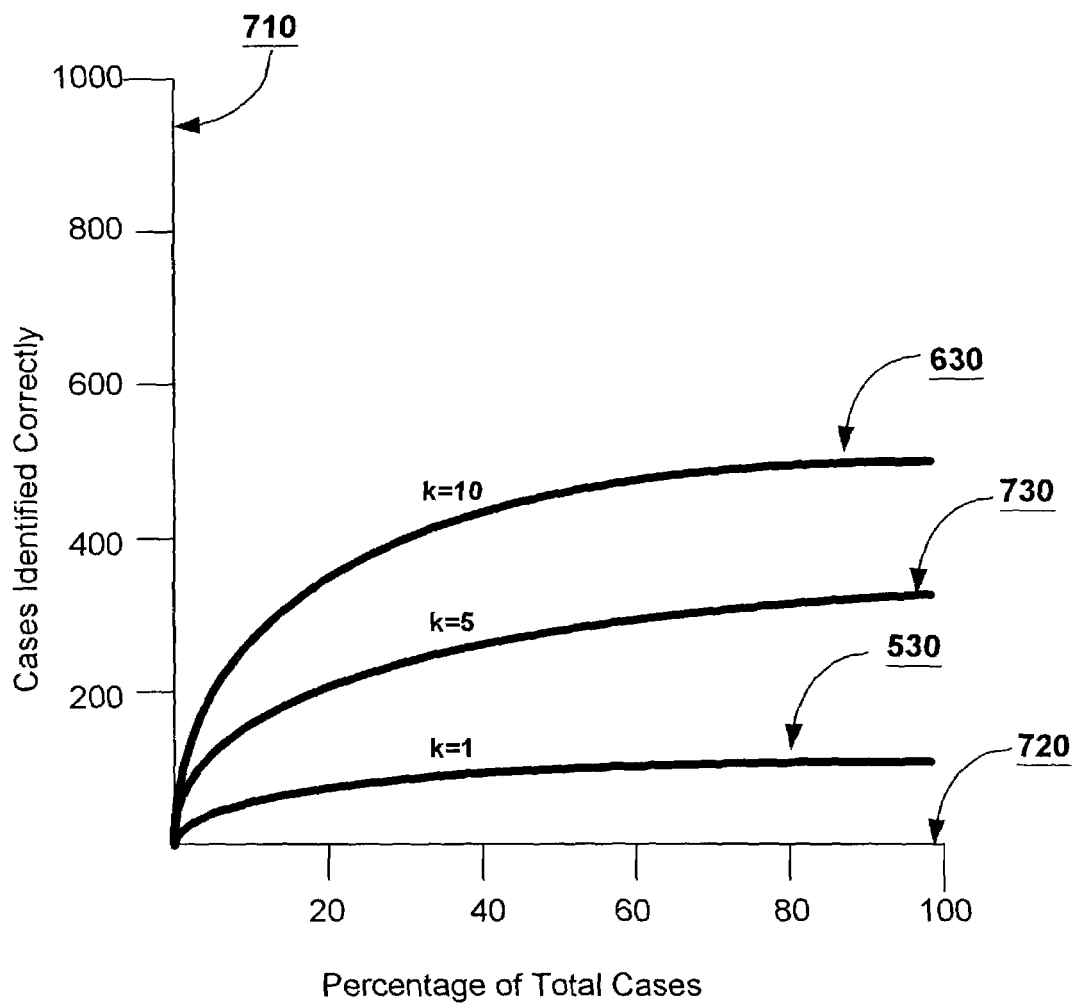
FIG. 7 is a chart according to the present invention with several association prediction evaluation lines depicted.

The single-association prediction line and the multiple-association prediction line displays described above provide an accuracy display for the model when it makes a set number k of predictions per case. It can be appreciated that the single-association prediction graph is equivalent to a multiple-association prediction graph where the size of the basket is one. Thus, for the single-association prediction line, k=1. In order to determine the model's effectiveness for a number of values of k, different graphs must be superimposed on each other. This is shown in FIG. 7, where the single-association prediction line 530 of FIG. 5 and the multiple-association prediction line 630 of FIG. 7 are displayed, along with a second multiple-association prediction line 730. X axis 720 and Y axis 710 provide a common reference for the prediction lines 530, 630, and 730. In this way, it can be seen how a number of such association prediction lines can be used to describe and compare model accuracy over several values of k. Additionally, prediction accuracy lines for the same basket size evaluating the accuracy of different models may also be displayed on one graph in order to compare the accuracy of several models.

Figure 8:
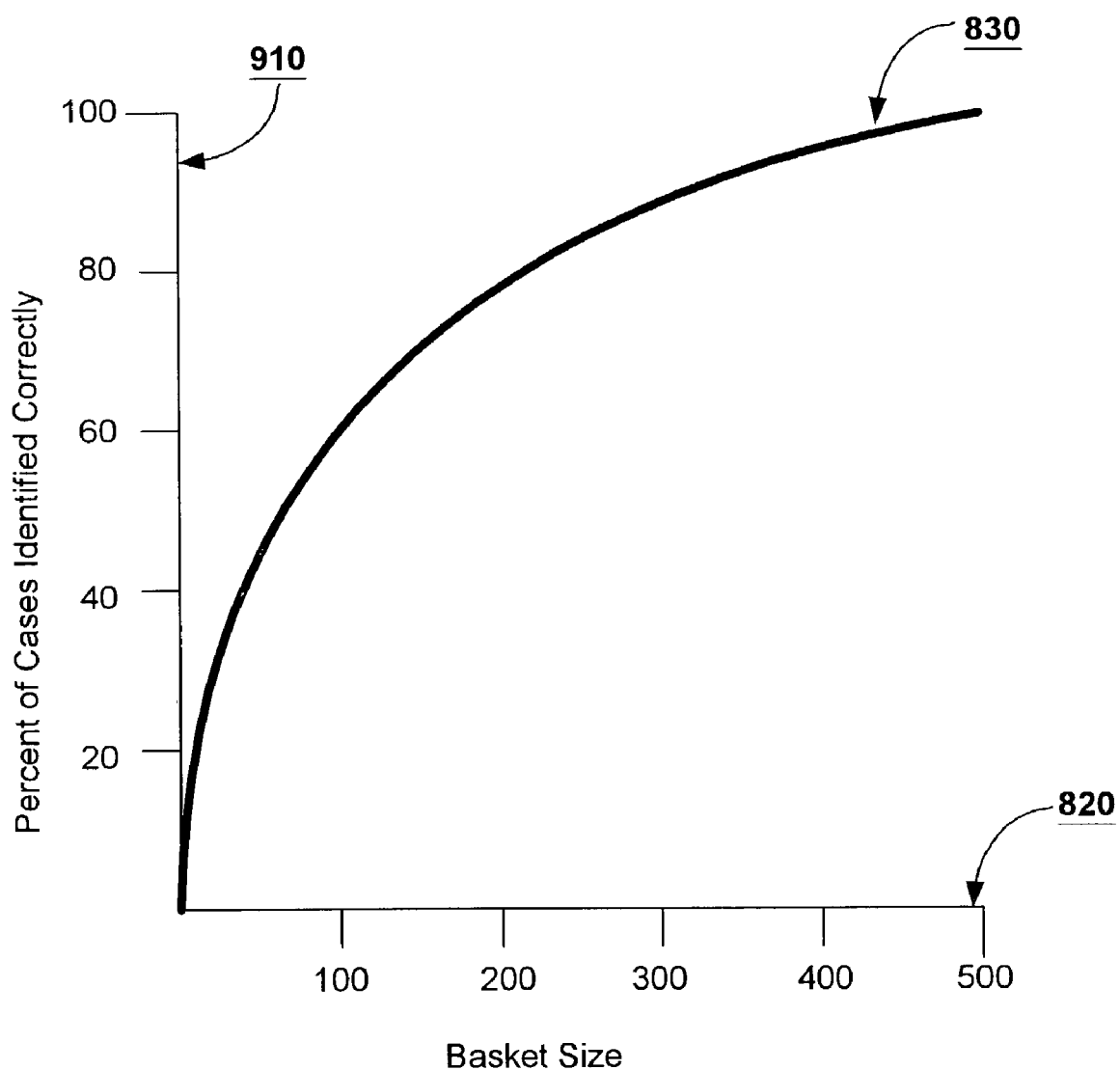
FIG. 8 is a chart according to the present invention with a comprehensive association prediction accuracy line depicted.

In addition to displays with multiple lines for multiple basket sizes, the accuracy of a model over several values of k may also be graphed. To produce this type of graph, a comprehensive association prediction accuracy graph, the accuracy of a model over all cases given a certain basket size is noted. This becomes a point from which a line may be generated. As shown in FIG. 8, the X axis 820 defines basket sizes, and the Y axis 810 defines percent of correct predictions. A point (X, Y) is graphed where, for all cases, the model predicts Y % of the cases correctly for a basket size of X. The result is comprehensive association accuracy prediction line 830. The X axis 820 may range over all possible basket sizes or may define a subrange of basket sizes to analyze. In the exemplary graph of FIG. 8, all possible basket sizes are included. It is notable that where X equals 0 (no predictions are made) Y also equals 0 (no correct predictions are made for any cases). Where X equals a basket size containing all possible predictions, Y equals 100% (or all cases identified correctly). This is because in a basket of all possible predictions, the correct prediction will always be included. A comprehensive association accuracy prediction line may be produced for several different models, and the models thereby compared.

Calculation and Display of Model Accuracy

Figure 9:
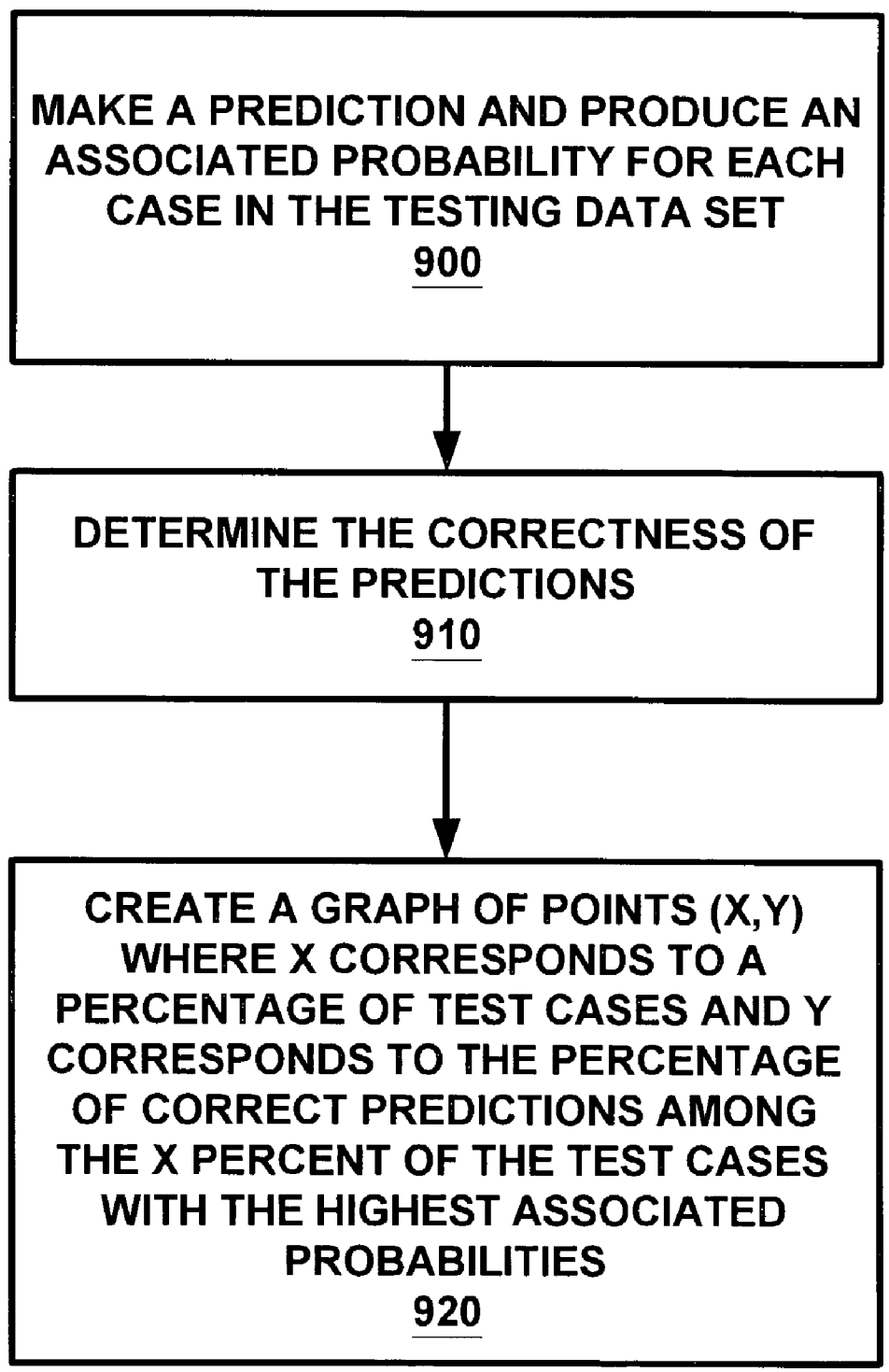
FIG. 9 is a flow chart of a method for displaying accuracy of a model in making predictions according to the present invention.

The new accuracy display technique is also applicable more generally. As shown in FIG. 9, given a model which can make a prediction, in order to produce an accuracy display, the model first makes a prediction and produces an associated probability for the prediction for each case in a testing data set 900. The correctness of the predictions is determined 910. A graph is then produced of the percentage of correct predictions for different groups of the cases with the highest probabilities. For example, the graph can be made from points (X,Y), where X corresponds to a percentage of cases from the testing data set, and where Y corresponds to the accuracy of predictions among the X % of the cases with the highest probabilities 920. Again, the X and Y axes may be measured in percentages, numbers of cases, or any similar measure of amount.

All of the prediction evaluation lines of the invention may be produced using some approximations. Not all points (X,Y) on the line must be exact, and the line may be produced using prior art algorithms for creating a representative line from data points. In this way, computational time may be saved for a small cost in accuracy of the display line. In place of lines, data points may be displayed. Equivalent graphs may be produced as is known in the prior art, by changing the scale of the axes, or by changing the position of the axes.

These and other possible variations that would be obvious to one skilled in the art are contemplated, and the invention should not be limited to any single embodiment.

Conclusion

Herein a system and method for mining model accuracy display for associative prediction is provided that produces a display of the accuracy of a model in providing associative predictions.

The invention also contemplates placing more than associative prediction evaluation lines on a single graph in order to compare and contrast the accuracy of one model over different basket sizes, to compare and contrast the accuracy of more than one model, or to compare and contrast the accuracy of one model on several testing data sets, which may have been selected for various attributes of the data sets.

As mentioned above, while exemplary embodiments of the present invention have been described in connection with various computing devices and network architectures, the underlying concepts may be applied to any computing device or system in which it is desirable to have a display of the accuracy of the prediction of attribute associations. Thus, the techniques for providing such a display in accordance with the present invention may be applied to a variety of applications and devices. For instance, the algorithm(s) of the invention may be applied to the operating system of a computing device, provided as a separate object on the device, as part of another object, as a downloadable object from a server, as a "middle man" between a device or object and the network, as a distributed object, etc. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent parametrization achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the techniques of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for accuracy display for a model, where, for each case in a testing data set containing one or more associated data items, said model predicts a basket containing a number k of predicted data items associated with said case, where said model produces an associated probability for said predictions, and where said associated data items and said predicted data items are contained in a set of possible associated data items comprising:

for each case, removing one of said associated data items from said case to produce a modified case and using said model to predict a basket of predicted data items given said modified case;

for each case, determining if said one of said associated data items removed from said case is contained in said basket predicted by said model;

producing a visual representation on a computer monitor of an associative prediction evaluation on a graph of at least two dimensions comprising at least two data points where for each of said data points: (a) a data point set of said cases from among said testing data set has been selected such that no case in said data point set has a lower associated probability for said basket of predictions made by said model than any case not in said data point set, (b) a first coordinate of said data points corresponds to the number of cases in said data point set, and (c) a second coordinate of said data points corresponds to the number of correct predictions for cases contained in said data point set.

2. A method according to claim 1, wherein said method further comprises:

sorting said cases by said associated probability.

3. A method according to claim 1, wherein k is equal to 1.

4. A method according to claim 1, wherein k is greater than 1, and wherein said model predicts a composite probability for said basket of predictions and where said associated probability for said basket of predictions is said composite probability.

5. A method according to claim 1, wherein k is greater than 1, and wherein said model predicts an individual probability for each prediction in said basket of predictions, and where said associated probability for said basket of predictions is based on said individual probabilities of each of said predictions in said basket of predictions.

6. A method according to claim 5, where said model predicts an individual probability for each data item in said set of possible associated data items, and where associated probability for said basket of predictions is equal to:

$$\frac{\sum_{i=1}^{k} p(A_i)}{\sum_{j=k+1}^{N} p(A_j)}$$

where N is the number of data items in said set of possible associated data items; where $p(A_j)$ represents said individual probability assigned by said model to an item i; where items 1 through k are said predicted data items contained in said basket; and where items k+1 through N are the associated data items contained in said set of possible associated data items but not in said basket.

7. A method according to claim 1, wherein, for each of said data points, said first coordinate is equal to said number of cases in said data point set.

8. A method according to claim 1, wherein, for each of said data points, said first coordinate is equal to the percentage of said cases in said testing data set which are contained in said data point set.

9. A method according to claim 1, wherein, for each of said data points, said second coordinate is equal to said number of correct predictions associated with cases contained in said data point set.

10. A method according to claim 1, wherein, for each of said data points, said second coordinate is equal to the percentage of said cases in said testing data set for which said prediction associated with said cases contained in said data point set is correct.

11. A method according to claim 1, where at a visual representation of an associative prediction evaluation for at least one other model is displayed on said graph.

12. A method according to claim 1, further comprising:
producing, on said graph, the visual representation of an associative prediction evaluation corresponding to an ideal model.

13. A method according to claim 1, further comprising:
producing, on said graph, the visual representation of an associative prediction evaluation corresponding to random model.

14. A computer executable instructions stored on a computer readable medium for performing the method of claim 1.

15. A method for accuracy display for a model, where, for each case in a testing data set containing one or more associated data items, said model predicts a basket containing a number of predicted data items associated with said case comprising:
producing a visual representation on a computer monitor of a comprehensive association prediction evaluation on a graph of at least two dimensions, said comprehensive association prediction evaluation comprising at least two points where for each of said data points: a second coordinate of said data point corresponds to the accuracy of said model when predicting a basket containing a number of items corresponding to a first coordinate of said data point, wherein said accuracy of said model when predicting a basket containing a number of items corresponding to a first coordinate of said data point is determined by, for each case, (a) removing one of said associated data items from said case to produce a modified case; (b) using said model to predict a basket of predicted data items containing a number of items corresponding to a first coordinate of said data point given said modified case; and (c) determining whether said one of said associated data items removed from said case is contained in said basket predicted by said model.

16. A method according to claim 15, wherein said accuracy of said model when predicting a basket containing a number of items corresponding to a first coordinate of said data point corresponds to the number of cases for which said determination determines that said one of said associated data items removed from said case is contained in said basket predicted by said model.

17. A method according to claim 15, wherein said accuracy of said model when predicting a basket containing a number of items corresponding to a first coordinate of said data point corresponds to the proportion of cases from among said testing data set for which said determination determines that said one of said associated data items removed from said case is contained in said basket predicted by said model.

18. A method according to claim 15, where at a visual representation of a comprehensive association prediction evaluation for at least one other model is displayed on said graph.

19. A computer executable instructions stored on a computer readable medium for performing the method of claim 15.

20. A method for accuracy display for a model, where, for each case in a testing data set containing one or more associated data items, said model predicts a basket containing a number of predicted data items associated with said case comprising:
producing a visual representation on a computer monitor of a comprehensive association prediction evaluation on a graph of at least two dimensions, said comprehensive association prediction evaluation comprising at least two points where for each of said data points: a second coordinate of said data point corresponds to the accuracy of said model when predicting a basket containing a number of items corresponding to a first coordinate of said data point, and
producing, on said graph, the visual representation of a comprehensive association prediction evaluation corresponding to a random model.

21. A computer storage medium comprising computer executable modules having computer-executable instructions for accuracy display for a model, where, for each case in a testing data set containing one or more associated data items, said model predicts a basket containing a number k of predicted data items associated with said case, where said model produces an associated probability for said predictions, and where said associated data items and said predicted data items are contained in a set of possible associated data items, said modules comprising:
a module for, for each case, removing one of said associated data items from said case to produce a modified case and using said model to predict a basket of predicted data items given said modified case;

a module for, for each case, determining if said one of said associated data items removed from said case is contained in said basket predicted by said model;

a module for producing a visual representation on a computer monitor of an associative prediction evaluation on a graph of at least two dimensions comprising at least two data points where for each of said data points: (a) a data point set of said cases from among said testing data set has been selected such that no case in said data point set has a lower associated probability for said basket of predictions made by said model than any case not in said data point set, (b) a first coordinate of said data points corresponds to the number of cases in said data point set, and (c) a second coordinate of said data points corresponds to the number of correct predictions for cases contained in said data point set.

22. A computer storage medium according to claim 21, where said modules further comprise:
a module for sorting said cases by said associated probability.

23. A computer storage medium according to claim 21, wherein k is equal to 1.

24. A computer storage medium according to claim 21, wherein k is greater than 1, and wherein said model predicts a composite probability for said basket of predictions and where said associated probability for said basket of predictions is said composite probability.

25. A computer storage medium according to claim 21, wherein k is greater than 1, and wherein said model predicts an individual probability for each prediction in said basket of predictions, and where said associated probability for said basket of predictions is based on said individual probabilities of each of said predictions in said basket of predictions.

26. A computer storage medium according to claim 25, where said model predicts an individual probability for each data item in said set of possible associated data items, and where associated probability for said basket of predictions is equal to:

$$\frac{\sum_{i=1}^{k} p(A_i)}{\sum_{j=k+1}^{N} p(A_j)}$$

where N is the number of data items in said set of possible associated data items; where $p(A_i)$ represents said individual probability assigned by said model to an item i; where items 1 through k are said predicted data items contained in said basket; and where items k+1 through N are the associated data items contained in said set of possible associated data items but not in said basket.

27. A computer storage medium according to claim 21, wherein, for each of said data points, said first coordinate is equal to said number of cases in said data point set.

28. A computer storage medium according to claim 21, wherein, for each of said data points, said first coordinate is equal to the percentage of said cases in said testing data set which are contained in said data point set.

29. A computer storage medium according to claim 21, wherein, for each of said data points, said second coordinate is equal to said number of correct predictions associated with cases contained in said data point set.

30. A computer storage medium according to claim 21, wherein, for each of said data points, said second coordinate is equal to the percentage of said cases in said testing data set for which said prediction associated with said cases contained in said data point set is correct.

31. A computer storage medium according to claim 21, where at a visual representation of an associative prediction evaluation for at least one other model is displayed on said graph.

32. A computer storage medium according to claim 21, said modules further comprising:
a module for producing, on said graph, the visual representation of an associative prediction evaluation corresponding to an ideal model.

33. A computer storage medium according to claim 21, said modules further comprising:
a module for producing, on said graph, the visual representation of an associative prediction evaluation corresponding to random model.

34. A computer storage medium comprising computer-executable modules having computer-executable instructions for accuracy display for a model, where, for each case in a testing data set containing one or more associated data items, said model predicts a basket containing a number of predicted data items associated with said case, said modules comprising:
a module for producing a visual representation on a computer monitor of a comprehensive association prediction evaluation on a graph of at least two dimensions, said comprehensive association prediction evaluation comprising at least two points where for each of said data points: a second coordinate of said data point corresponds to the accuracy of said model when predicting a basket containing a number of items corresponding to a first coordinate of said data point, wherein said accuracy of said model when predicting a basket containing a number of items corresponding to a first coordinate of said data point is determined by, for each case, (a) removing one of said associated data items from said case to produce a modified case; (b) using said model to predict a basket of predicted data items containing a number of items corresponding to a first coordinate of said data point given said modified case; and (c) determining whether said one of said associated data items removed from said case is contained in said basket predicted by said model.

35. A computer storage medium according to claim 34, wherein said accuracy of said model when predicting a basket containing a number of items corresponding to a first coordinate of said data point corresponds to the number of cases for which said determination determines that said one of said associated data items removed from said case is contained in said basket predicted by said model.

36. A computer storage medium according to claim 34, wherein said accuracy of said model when predicting a basket containing a number of items corresponding to a first coordinate of said data point corresponds to the proportion of cases from among said testing data set for which said determination determines that said one of said associated data items removed from said case is contained in said basket predicted by said model.

37. A computer storage medium according to claim 34, where at a visual representation of a comprehensive association prediction evaluation for at least one other model is displayed on said graph.

38. A computer storage medium comprising computer-executable modules having computer-executable instructions for accuracy display for a model, where, for each case in a testing data set containing one or more associated data items, said model predicts a basket containing a number of predicted data items associated with said case, said modules comprising:

a module for producing a visual representation on a computer monitor of a comprehensive association prediction evaluation on a graph of at least two dimensions, said comprehensive association prediction evaluation comprising at least two points where for each of said data points: a second coordinate of said data point corresponds to the accuracy of said model when predicting a basket containing a number of items corresponding to a first coordinate of said data point, and a module for producing, on said graph, the visual representation of a comprehensive association prediction evaluation corresponding to a random model.

39. A computer device for accuracy display for a model, where, for each case in a testing data set containing one or more associated data items, said model predicts a basket containing a number k of predicted data items associated with said case, where said model produces an associated probability for said predictions, and where said associated data items and said predicted data items are contained in a set of possible associated data items, comprising:

means for, for each case, removing one of said associated data items from said case to produce a modified case and using said model to predict a basket of predicted data items given said modified case;

means for, for each case, determining if said one of said associated data items removed from said case is contained in said basket predicted by said model;

means for producing a visual representation of an associative prediction evaluation on a graph of at least two dimensions comprising at least two data points where for each of said data points: (a) a data point set of said cases from among said testing data set has been selected such that no case in said data point set has a lower associated probability for said basket of predictions made by said model than any case not in said data point set, (b) a first coordinate of said data points corresponds to the number of cases in said data point set, and (c) a second coordinate of said data points corresponds to the number of correct predictions for cases contained in said data point set.

40. A computer device according to claim 39, further comprising:

means for sorting said cases by said associated probability.

41. A computer device according to claim 39, wherein k is equal to 1.

42. A computer device according to claim 39, wherein k is greater than 1, and wherein said model predicts a composite probability for said basket of predictions and where said associated probability for said basket of predictions is said composite probability.

43. A computer device according to claim 39, wherein k is greater than 1, and wherein said model predicts an individual probability for each prediction in said basket of predictions, and where said associated probability for said basket of predictions is based on said individual probabilities of each of said predictions in said basket of predictions.

44. A computer device according to claim 43, where said model predicts an individual probability for each data item in said set of possible associated data items, and where associated probability for said basket of predictions is equal to:

$$\frac{\sum_{i=1}^{k} p(A_i)}{\sum_{j=k+1}^{N} p(A_j)}$$

where N is the number of data items in said set of possible associated data items; where $p(A_i)$ represents said individual probability assigned by said model to an item i; where items 1 through k are said predicted data items contained in said basket; and where items k+1 through N are the associated data items contained in said set of possible associated data items but not in said basket.

45. A computer device according to claim 39, wherein, for each of said data points, said first coordinate is equal to said number of cases in said data point set.

46. A computer device according to claim 39, wherein, for each of said data points, said first coordinate is equal to the percentage of said cases in said testing data set which are contained in said data point set.

47. A computer device according to claim 39, wherein, for each of said data points, said second coordinate is equal to said number of correct predictions associated with cases contained in said data point set.

48. A computer device according to claim 39, wherein, for each of said data points, said second coordinate is equal to the percentage of said cases in said testing data set for which said prediction associated with said cases contained in said data point set is correct.

49. A computer device according to claim 39, where at a visual representation of an associative prediction evaluation for at least one other model is displayed on said graph.

50. A computer device according to claim 39, further comprising: means for producing, on said graph, the visual representation of an associative prediction evaluation corresponding to an ideal model.

51. A computer device according to claim 39, further comprising:

means for producing, on said graph, the visual representation of an associative prediction evaluation corresponding to random model.

52. A computer device for accuracy display for a model, where, for each case in a testing data set containing one or more associated data items, said model predicts a basket containing a number of predicted data items associated with said case, comprising:

means producing a visual representation of a comprehensive association prediction evaluation on a graph of at least two dimensions, said comprehensive association prediction evaluation comprising at least two points where for each of said data points: a second coordinate of said data point corresponds to the accuracy of said model when predicting a basket containing a number of items corresponding to a first coordinate of said data point, wherein said accuracy of said model when predicting a basket containing a number of items corresponding to a first coordinate of said data point is determined by, for each case, (a) removing one of said associated data items from said case to produce a modified case; (b) using said model to predict a basket of predicted data items containing a number of items corresponding to a first coordinate of said data point given said modified case; and (c) determining whether said one of said associated data items removed from said case is contained in said basket predicted by said model.

53. A computer device according to claim 52, wherein said accuracy of said model when predicting a basket containing a number of items corresponding to a first coordinate of said data point corresponds to the number of cases for which said determination determines that said one of said associated data items removed from said case is contained in said basket predicted by said model.

54. A computer device according to claim 52, wherein said accuracy of said model when predicting a basket containing a number of items corresponding to a first coordinate of said data point corresponds to the proportion of cases from among said testing data set for which said determination determines that said one of said associated data items removed from said case is contained in said basket predicted by said model.

55. A computer device according to claim 52, where at a visual representation of a comprehensive association prediction evaluation for at least one other model is displayed on said graph.

56. A computer device for accuracy display for a model, where, for each case in a testing data set containing one or more associated data items, said model predicts a basket containing a number of predicted data items associated with said case, comprising:
 means producing a visual representation of a comprehensive association prediction evaluation on a graph of at least two dimensions, said comprehensive association prediction evaluation comprising at least two points where for each of said data points: a second coordinate of said data point corresponds to the accuracy of said model when predicting a basket containing a number of items corresponding to a first coordinate of said data point, and
 means for producing, on said graph, the visual representation of a comprehensive association prediction evaluation corresponding to a random model.

57. A method for accuracy display for a model where, for each case in a testing data set containing one or more associated data items, where said model makes a prediction regarding each of said cases, where said model produces an associated probability of correctness for each of said predictions, and where the correctness of the predictions can be determined, comprising:
 using said model to make a prediction for each case in a testing data set and to produce an associated probability for each of said predictions;
 determining the correctness of said predictions;
 producing a visual representation on a computer monitor of prediction accuracy on a graph of at least two dimension comprising at least two data points where for each of said data points: (a) a data point set of said cases has been selected such that no case in said data point set has a lower associated probability for said prediction than any case not in said data point set, (b) a first coordinate of said data point corresponds to the number of cases in said data point set, and (c) a second coordinate of said data point corresponds to the number of correct predictions for cases contained in said data point set.

58. A method according to claim 57, wherein said method further comprises:
 sorting cases by said associated probability.

59. A method according to claim 57, wherein, for each of said data points, said first coordinate is equal to said number of cases in said data point set.

60. A method according to claim 57, wherein, for each of said data points, said first coordinate is equal to the percentage of said cases in said testing data set which are contained in said data point set.

61. A method according to claim 57, wherein, for each of said data points, said second coordinate is equal to said number of correct predictions associated with cases contained in said data point set.

62. A method according to claim 57, wherein, for each of said data points, said second coordinate is equal to the percentage of said cases in said testing data set for which said prediction associated with said cases contained in said data point set is correct.

63. A method according to claim 57, where at a visual representation of prediction accuracy for at least one other model is displayed on said graph.

64. A method according to claim 57, further comprising:
 producing, on said graph, the visual representation of prediction accuracy corresponding to an ideal model.

65. A method according to claim 57, further comprising:
 producing, on said graph, the visual representation of prediction accuracy corresponding to random model.

66. A computer storage medium comprising computer executable modules having computer-executable instructions for accuracy display for a model where, for each case in a testing data set containing one or more associated data items, where said model makes a prediction regarding each of said cases, where said model produces an associated probability of correctness for each of said predictions, and where the correctness of the predictions can be determined, said modules comprising:
 a module for using said model to make a prediction for each case in a testing data set and to produce an associated probability for each of said predictions;
 a module for determining the correctness of said predictions;
 a module for producing a visual representation on a computer monitor of prediction accuracy on a graph of at least two dimension comprising at least two data points where for each of said data points: (a) a data point set of said cases has been selected such that no case in said data point set has a lower associated probability for said prediction than any case not in said data point set, (b) a first coordinate of said data point corresponds to the number of cases in said data point set, and (c) a second coordinate of said data point corresponds to the number of correct predictions for cases contained in said data point set.

67. A computer storage medium according to claim 66, wherein said computer-readable medium further comprises:
 a module for sorting cases by said associated probability.

68. A computer storage medium according to claim 66, wherein, for each of said data points, said first coordinate is equal to said number of cases in said data point set.

69. A computer storage medium according to claim 66, wherein, for each of said data points, said first coordinate is equal to the percentage of said cases in said testing data set which are contained in said data point set.

70. A computer storage medium according to claim 66, wherein, for each of said data points, said second coordinate is equal to said number of correct predictions associated with cases contained in said data point set.

71. A computer storage medium according to claim 66, wherein, for each of said data points, said second coordinate is equal to the percentage of said cases in said testing data set for which said prediction associated with said cases contained in said data point set is correct.

72. A computer storage medium according to claim 66, where at a visual representation of prediction accuracy for at least one other model is displayed on said graph.

73. A computer storage medium according to claim 66, further comprising:
a module for producing, on said graph, the visual representation of prediction accuracy corresponding to an ideal model.

74. A computer storage medium according to claim 66, further comprising:
a module for producing, on said graph, the visual representation of prediction accuracy corresponding to random model.

75. A computer device for accuracy display for a model where, for each case in a testing data set containing one or more associated data items, where said model makes a prediction regarding each of said cases, where said model produces an associated probability of correctness for each of said predictions, and where the correctness of the predictions can be determined, comprising:
means for using said model to make a prediction for each case in a testing data set and to produce an associated probability for each of said predictions;
means for determining the correctness of said predictions;
means for producing a visual representation of prediction accuracy on a graph of at least two dimension comprising at least two data points where for each of said data points: (a) a data point set of said cases has been selected such that no case in said data point set has a lower associated probability for said prediction than any case not in said data point set, (b) a first coordinate of said data point corresponds to the number of cases in said data point set, and (c) a second coordinate of said data point corresponds to the number of correct predictions for cases contained in said data point set.

76. A computer device according to claim 75, wherein said computer-readable medium further comprises:
means for sorting cases by said associated probability.

77. A computer device according to claim 75, wherein, for each of said data points, said first coordinate is equal to said number of cases in said data point set.

78. A computer device according to claim 75, wherein, for each of said data points, said first coordinate is equal to the percentage of said cases in said testing data set which are contained in said data point set.

79. A computer device according to claim 75, wherein, for each of said data points, said second coordinate is equal to said number of correct predictions associated with cases contained in said data point set.

80. A computer device according to claim 75, wherein, for each of said data points, said second coordinate is equal to the percentage of said cases in said testing data set for which said prediction associated with said cases contained in said data point set is correct.

81. A computer device according to claim 75, where at a visual representation of prediction accuracy for at least one other model is displayed on said graph.

82. A computer device according to claim 75, further comprising:
means for producing, on said graph, the visual representation of prediction accuracy corresponding to an ideal model.

83. A computer device according to claim 75, further comprising:
means for producing, on said graph, the visual representation of prediction accuracy corresponding to random model.

* * * * *